US011106600B2

(12) United States Patent
Loh et al.

(10) Patent No.: US 11,106,600 B2
(45) Date of Patent: Aug. 31, 2021

(54) CACHE REPLACEMENT BASED ON TRANSLATION LOOKASIDE BUFFER EVICTIONS

(71) Applicant: ADVANCED MICRO DEVICES, INC., Santa Clara, CA (US)

(72) Inventors: Gabriel H. Loh, Bellevue, WA (US); Paul Moyer, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/256,634

(22) Filed: Jan. 24, 2019

(65) Prior Publication Data

US 2020/0242049 A1    Jul. 30, 2020

(51) Int. Cl.
| | |
|---|---|
| *G06F 12/10* | (2016.01) |
| *G06F 12/126* | (2016.01) |
| *G06F 12/0871* | (2016.01) |
| *G06F 12/0808* | (2016.01) |
| *G06F 12/1027* | (2016.01) |

(52) U.S. Cl.
CPC ........ *G06F 12/126* (2013.01); *G06F 12/0808* (2013.01); *G06F 12/0871* (2013.01); *G06F 12/1027* (2013.01)

(58) Field of Classification Search
CPC .......... G06F 12/1027; G06F 2212/683; G06F 2212/68; G06F 12/0811; G06F 12/0808; G06F 2212/1021
See application file for complete search history.

(56) References Cited

U.S. PATENT DOCUMENTS

| | | | |
|---|---|---|---|
| 5,930,832 A * | 7/1999 | Heaslip ............... | G06F 12/1054 711/207 |
| 2008/0229052 A1 | 9/2008 | Ozer et al. | |
| 2009/0006803 A1 | 1/2009 | Luick | |
| 2010/0138610 A1 | 6/2010 | Rappoport et al. | |
| 2012/0137079 A1 | 5/2012 | Ueda | |
| 2014/0304477 A1 | 10/2014 | Hughes et al. | |
| 2018/0089094 A1* | 3/2018 | Clancy ............... | G06F 12/0895 |
| 2019/0034349 A1* | 1/2019 | McAvoy ............. | G06F 12/0895 |

OTHER PUBLICATIONS

International Search Report and Written Opinion dated May 11, 2020 for International Application No. PCT/US2020/013856, 11 pages.

* cited by examiner

*Primary Examiner* — John A Lane (57) ABSTRACT

A processing system adjusts a cache replacement priority of cache lines at a cache based on evictions of entries mapping virtual-to-physical address translations from a translation lookaside buffer (TLB). Upon eviction of a TLB entry, the processing system identifies cache lines corresponding to the physical addresses of the evicted TLB entry and evicts the cache lines or adjusts the cache replacement priority of the cache lines so that their eviction from the cache will be accelerated.

20 Claims, 7 Drawing Sheets

CACHE REPLACEMENT BASED ON TRANSLATION LOOKASIDE BUFFER EVICTIONS

BACKGROUND

To support execution of instructions, processing systems typically implement one or more compute complexes, each compute complex having one or more processor cores and a memory hierarchy having memory modules to store instructions and data to be accessed by the executing instructions. Each processor core is associated with a main memory at the top of the hierarchy that stores a larger quantity of data that can be accessed by the executing instructions at the corresponding processor core and one or more local levels of caches at lower levels of the memory hierarchy that store subsets of the data stored at the main memory. In the course of executing instructions, a processor core may access data that is stored at a local cache from which accesses initiated by the processor core may be performed relatively quickly and with a relatively low expenditure of energy, or at a main memory from which accesses initiated by the processor core may be performed relatively slowly and with a relatively high expenditure of energy.

Typically, the more proximate to a processor that data is stored in the memory hierarchy, the more quickly and energy-efficiently it can be accessed by the processor. To enhance processing efficiency, the processing system can implement a memory management protocol that governs the particular set of data stored at each level of the memory hierarchy. For example, the processing system can implement a memory management protocol that moves data that has recently been requested for access to levels of the memory hierarchy closer to the processor core, with the expectation that the data will be accessed again by the processor core in the near future, and moves data that has not been accessed recently to more remote levels of the memory hierarchy. However, memory management protocols are suboptimal, in that they allow data that is unlikely to be accessed by the processor core in the near future to remain stored in local caches.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Many processing systems use virtual memory for handling data accesses by executing programs (e.g., applications, operating systems, device drivers, etc.). In such a processing system, programs access memory using "virtual addresses" in "virtual address spaces," which are local address spaces that are specific to corresponding programs, instead of accessing memory using addresses based on the physical locations (or "physical addresses") of blocks of memory (or "pages"). Thus, to support memory accesses, the processing system typically employs address translation circuitry to translate the virtual addresses to corresponding physical addresses.

Processor cores in the processing system keep track of the physical locations of the pages for the programs so that programs are not required to keep track of the physical locations of pages in memory. As part of managing the physical locations of pages, the processor cores translate the virtual addresses used by the programs in memory access requests into the physical addresses where the data is actually located. The processor cores then use the physical addresses to perform the memory accesses for the programs.

In order to enable the virtual address to physical address translation, the computing device includes a page table, which is a record stored in a memory of the computing device that includes an entry, or a "page table entry," with virtual address to physical address translation information for pages of data that are stored in the main memory. Upon receiving a request from a program to access memory at a given virtual address, a processor acquires corresponding physical address information from the page table by performing a page table walk, during which the page table is searched, possibly entry-by-entry, for a page table entry that provides the physical address associated with the virtual address.

Because the above-described page table walks are relatively slow, the processing system includes one or more translation lookaside buffers (TLBs), which are local caches in each processor that are used by the processor core for storing a limited number of copies of page table entries acquired during page table walks (or information based on page table entries). During operation, processor cores first attempt to acquire cached page table entries from the corresponding TLB for performing virtual address to physical address translations. When the copy of the corresponding page table entry is not present in the TLB (i.e., when a "miss" occurs), the processor cores perform a page table walk to acquire the desired page table entry and then cache a copy of the acquired page table entry in the TLB.

The TLBs have limited storage capacity and employ a memory management protocol to determine which TLB entry is to be evicted to make room for caching a newly acquired TLB entry once the TLB is full. For example, the memory management protocol may specify that TLB entries are to be evicted based on a least recently used (LRU) policy. Eviction of a TLB entry based on an LRU policy indicates that no cache lines corresponding to the page address of the TLB entry has been recently accessed. For example, a 4 KB page contains sixty-four 64-byte cache lines, so a TLB eviction means that none of the corresponding 64 cache lines have been recently accessed by the processor core. If none of the corresponding cache lines have been recently accessed, then there is a strong likelihood that the corresponding cache lines will continue to not be needed by the processor core in the near future.

FIGS. 1-7 illustrate techniques for a processing system to adjust a cache replacement priority of cache lines at a cache based on evictions of entries mapping virtual-to-physical address translations from a translation lookaside buffer (TLB). Upon eviction of a TLB entry, the processing system identifies cache lines corresponding to the physical addresses of the evicted TLB entry and evicts the cache lines or adjusts the cache replacement priority of the cache lines so that their eviction from the cache will be accelerated. In some embodiments, a cache controller of the cache walks the cache or a subset of the cache to identify cache lines having addresses that match the physical addresses of the evicted TLB entry (i.e., cache lines that correspond to the TLB entry). The cache controller either invalidates the identified cache lines or lowers the retention priority of the identified cache lines. To conserve resources, in some embodiments, the cache controller only walks the cache to identify cache lines corresponding to the TLB entry during cycles in which the cache controller is not performing any other cache accesses.

In other embodiments, instead of walking the cache to identify cache lines having addresses that match the physical address of the evicted TLB entry, the cache controller stores the physical page addresses of evicted TLB entries at a buffer and, during an access to a set of the cache, compares the addresses of all cache lines in the set to the page addresses stored at the buffer. By using the buffer and comparing cache lines of a set to the stored page addresses during accesses to the set, the cache controller does not perform additional accesses to the cache to search for cache lines corresponding to evicted TLB entries. In some embodiments employing multiple processor cores and a coherence directory to track cache lines cached in the different processor cores, the TLB notifies the coherence directory of a TLB entry eviction, and the coherence directory marks the corresponding page as "dead", which causes cache lines corresponding to the page to be invalidated or flushed from all of caches associated with each of the processor cores. By biasing the processing system's cache replacement policy based on TLB evictions, the processing system improves the cache replacement policy, resulting in increased processing efficiency.

Figure 1:
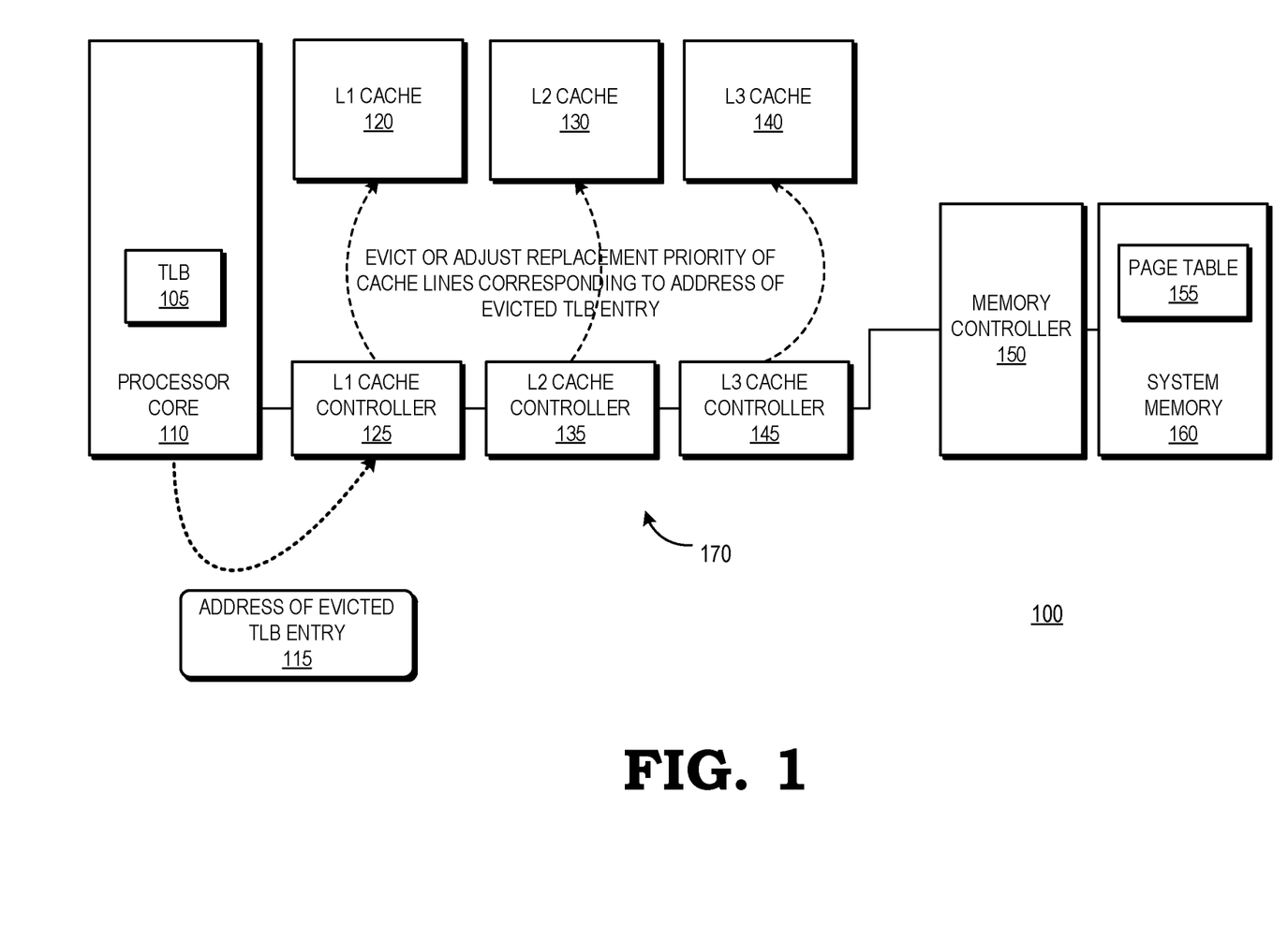
FIG. 1 is a block diagram of a processing system having a memory hierarchy that employs a cache replacement policy based on evictions of entries from a translation lookaside buffer (TLB) in accordance with some embodiments.

FIG. 1 illustrates a processing system 100 having a memory hierarchy that employs a cache replacement policy based at least in part on evictions of entries from a translation lookaside buffer (TLB) in accordance with some embodiments. The processing system 100 includes a processor core 110 having a TLB 105, a cache hierarchy 170, a memory controller 150, and a system memory 160. In various embodiments, the processing system 100 is employed in any of a number of devices, such as a personal computer, workstation, mobile device such as a smartphone, a video game console, smart TV, and the like.

The processor core 110 is implemented as a central processor unit core (CPU), graphics processor unit core (GPU), specialized processor core or accelerator, application-specific integrated circuit (ASIC), field programmable gate array (FPGA), and the like. The processor core 110 includes one or more instruction pipelines to execute instructions, thereby carrying out tasks on behalf of an electronic device. While the processor core 110 may have some amount of integral memory, for example, in the form of a register file, such memory is typically limited in storage capacity. Accordingly, in order to execute instructions, the processor core 110 stores and retrieves data from the memory hierarchy of the processing system 100, including the cache hierarchy 104 and the system memory 160. In particular, in the course of executing instructions, the processor core 110 generates operations, referred to as memory access requests, to store (a store operation) data at or load (a load operation) data from the memory hierarchy. The cache hierarchy 170 and system memory 160 work together to satisfy memory access requests, as described further herein.

The memory controller 150 operates as the interface between the cache hierarchy 170 and the system memory 160. Thus, data to be cached in the cache hierarchy 170 typically is manipulated as blocks of data referred to as "cache lines", and which are addressed or otherwise located in a memory hierarchy using a physical address of system memory 160. Cache lines are accessed from the system memory 160 by the memory controller 150 in response to memory requests from the cache hierarchy 170, and the cache lines are stored, or cached, in one or more caches of the cache hierarchy 170. Likewise, when a cache line containing modified data is evicted from the cache hierarchy 170 and thus needs to be updated in the system memory 160, the memory controller 150 manages this write-back process.

The cache hierarchy 104 includes one or more levels of caches, such as a first level (L1) cache 120 and L1 cache controller 125, a second level (L2) cache 130 and L2 cache controller 135, and a third level (L3) cache 140 and L3 cache controller 145. Although the illustrated example includes three levels, in other embodiments the cache hierarchy includes fewer than three levels or more than three levels. The caches of the cache hierarchy 170 are used to cache data for access and manipulation by the processor core 110. Typically, caches at a lower level (e.g., L1) tend to have lower storage capacity and lower access latencies, while caches at the higher level (e.g., L3) tend to have higher storage capacity and higher access latencies. Accordingly, cache lines of data are transferred among the caches of different cache levels so as to better optimize the utilization of the cache data in view of the caches' storage capacities and access latencies through cache line eviction processes and cache line installation processes managed by cache logic of the cache controllers 125, 135, 145 of the individual caches of the cache hierarchy 170.

The L1 cache controller 125 receives memory access requests for data from the processor core 110 and searches the L1 cache 120 to determine if one of the cache entries stores a cache line associated with the memory address targeted by the memory access request. If the requested cache line is found in the L1 cache 120, a cache hit has occurred. In the event of a cache hit, the L1 cache controller 125 satisfies the memory access request by, in the case of a read operation, providing the requested cache line from the L1 cache 120 to the processor core 110 or, in the case of a write operation, storing the write data to the cache entry. If the requested cache line is not found in the L1 cache 120, a cache miss has occurred. In the event of a cache miss at the L1 cache 120, the L1 cache controller 125 provides the memory access request to the L2 cache 130.

Similar to the L1 cache 120, the L2 cache 130 is a memory that includes a set of entries, each of which stores an associated cache line. The L2 cache controller 135 receives memory access requests from the L1 cache controller 125 in response to cache misses at the L1 cache 120. In response to receiving a memory access request, the L2 cache controller 135 identifies whether one of the cache entries of the L2 cache 130 stores data associated with the memory address targeted by the memory access request. If so, the L2 cache controller 135 identifies a cache hit, and provides the requested data from the L2 cache 130 to the L1 cache 120. If the requested data is not found in the L2 cache 130, the L2 cache controller 135 identifies a cache miss and provides the memory access request to the L3 cache 140.

As with the L1 cache 120 and L2 cache 130, the L3 cache 140 is a memory including a set of entries, with each entry configured to store a cache line. The L3 cache controller 145 receives memory access requests from the L2 cache controller 135. In response to receiving a memory access request, the L3 cache controller 145 identifies whether an entry of the L3 cache 140 stores data associated with the memory address targeted by the memory access request. In the event of a cache hit, the L3 cache controller 145 provides the requested data from the L3 cache 140 to the L2 cache 130, which stores the data and in turn provides the data to the L1 cache 120, which satisfies the memory access request as described above. In the event of a cache miss at the L3 cache 140, the L3 cache controller 145 provides the memory access request to the system memory 160. The system memory 160 retrieves the cache line at the memory address targeted by the request and provides the cache line to the L3 cache 140, which in turn provides the cache line to the L2 cache 130 for provision to the L1 cache 120, where the memory access request is satisfied. Thus, as described above, the memory access request traverses the memory hierarchy until the requested data is found. The requested data is then transferred to the L1 cache 120, wherein the memory access request is satisfied.

In some embodiments, each of the L1 cache 120, L2 cache 130, and L3 cache 140 is a set associative cache, wherein each cache is divided into a number of sets. Each set includes a number of ways, with each way corresponding to a cache entry that stores a cache line. Each set only stores a cache line associated with a subset of memory addresses, wherein the subset associated with a set is identified by the corresponding cache controller based on a portion of the memory address referred to as the index. By employing set associativity, the caches 120, 130, and 140 facilitate relatively quick identification of cache misses and cache hits. Further, in some embodiments the L3 cache 140 is larger than the L2 cache 130, such that it employs a larger index size for each of its sets.

In some embodiments, the caches 120, 130, and 140 are sized such that they typically are unable to store, at a given point in time, all the data that is requested, or may be requested, by the processor core 110, thereby requiring data to be transferred through the memory hierarchy as described above. To ensure data coherency and efficient transfer of data through the memory hierarchy, each of the cache controllers 125, 135, and 145 implements a replacement policy to identify if there is an entry in a set available to store a received cache line and, if not, to select one of the entries in the set for replacement. The availability of a cache entry is indicated by status information associated with the entry, referred to as the valid status of the entry. In particular, a cache line having an invalid validity status (referred to herein as an invalid cache line) is one that is available to store data and a cache line having a valid validity status (referred to herein as a valid cache line) is one that is not available to store data unless it is replaced. To replace a valid cache line at an entry with an incoming cache line, the cache controller for the cache first evicts the valid cache line by transferring it to one or more other levels of the memory hierarchy, and then stores the incoming cache line at the entry.

To illustrate, in response to a reset of the processing system 100, all cache lines in each of L1 cache 120, L2 cache 130, and L3 cache 140 are set by their respective cache controller to an invalid state. As a cache entry is populated with a cache line retrieved from system memory 160, the corresponding cache controller sets the cache entry to a valid state. A cache way containing a cache line that has been set to an invalid state may receive an incoming cache line, which will displace or overwrite the invalid cache line. When a cache receives a cache line to be stored, it must select a cache way where the cache line is to be stored. If the cache set associated with the incoming cache line has room available (i.e., has one or more cache ways indicated as containing invalid cache lines), the incoming cache line will be stored at one of the invalid ways. However, if all cache ways in the set associated with the incoming cache line are indicated as valid, the cache controller selects a cache line of the set associated with the new cache line to be evicted to make room for the incoming cache line.

The particular criteria employed by a cache controller to select the cache line for replacement is referred to as a replacement policy. For example, in some embodiments the cache controller 125 implements a replacement policy at the cache 120 wherein it selects for eviction the least recently used cache line (that is, the cache line that was least recently the target of a memory access operation) in the cache set associated with the incoming cache line. In other embodiments, the cache controller 125 implements a replacement policy at the cache 120 wherein it selects for eviction the least frequently used cache line (that is, the cache line that was historically the least frequent target of memory access operations for a particular time period) in the cache set associated with the incoming cache line. Other replacement policies include re-reference interval prediction.

The processor core 110 accesses the system memory 160 on the basis of virtual addresses that are mapped to physical addresses in the system memory 160. Translations of virtual addresses to physical addresses are stored in one or more page tables 155. Each process that is executing in the processing system 100 has a corresponding page table 155. The page table 155 for a process translates the virtual addresses that are being used by the process to physical addresses in the system memory 160. In some embodiments, the entirety of the page table for a process is stored in the system memory 160.

Translations that are frequently used by the processor core 110 are stored in TLB 105 that is implemented in the processor core 110. The TLB 105 is used to cache frequently requested virtual-to-physical address translations. Entries including frequently used address translations are written from the page tables 155 into the TLB 105. The processor core 110 is therefore able to retrieve the address translations from the TLB 105 without the overhead of searching for the translation in the page table 155. Entries are evicted from the TLB 105 to make room for new entries according to a TLB replacement policy. If each TLB entry represents a 4 KB page containing sixty-four 64-byte cache lines and the TLB replacement policy evicts the least recently used TLB entry, eviction of a TLB entry indicates that none of the sixty-four cache lines have been recently accessed by the processor core 110. Nonetheless, due to inefficiencies in existing cache replacement policies, it is likely that at least some of the sixty-four cache lines corresponding to the evicted TLB entry will still be stored as valid entries in one or more of the L1 cache 120, L2 cache 130, or L3 cache 140. Although a 4 KB page size has been described for ease of illustration, the TLB 105 is not limited to 4 KB pages, and in some embodiments stores other page sizes, such as 2 MB, 1 GB, etc., as well as a combination of page sizes.

To improve processing efficiency, the TLB 105 communicates the memory page address of the evicted TLB entry 115 to cache logic such as one or more of the L1 cache controller 125, the L2 cache controller 135, and the L3 cache controller 145. In some embodiments, the TLB 105 communicates the physical address of the evicted TLB entry 115 to the cache logic and in other embodiments, the TLB 105 communicates both the virtual address and physical address of the evicted page to the cache logic. In response to receiving the address of the evicted TLB entry 115, the cache logic identifies, in the corresponding cache, cache lines corresponding to the memory page address of the evicted TLB entry 115. The cache logic selects the corresponding cache lines for replacement, either by changing their status to invalid or by adjusting their priority for replacement under the cache replacement policy. In this way, the corresponding cache lines are more likely to be evicted from the L1 cache 120, L2 cache 130, and L3 cache 140 sooner than other cache lines whose corresponding TLB entries are still in active use.

In operation, upon eviction from the TLB 105, the physical page address corresponding to the evicted TLB entry 115 is sent by the TLB 105 to the cache logic of one or more of the L1 cache controller 125, the L2 cache controller 135, and the L3 cache controller 145. In embodiments in which the TLB 105 is an instruction TLB (ITLB), then upon an eviction from the ITLB, the ITLB sends the page address to the level 1 instruction cache (IL1) logic (not shown). In some embodiments, in response to receiving the physical page address of the evicted TLB entry 115 from the TLB 105, the cache logic such as the L1 cache controller 125, the L2 cache controller 135, or the L3 cache controller 145 walks the corresponding L1 cache 120, L2 cache 130, or L3 cache 140 and invalidates all cache lines belonging to the evicted page. Thus, for a 4 KB page, walking the cache requires up to 64 cache accesses. For larger caches, such as an L3 cache with several megabytes of capacity, the L3 cache controller 145 walks only a subset of the L3 cache 140 where the 64 cache lines could potentially be stored.

In some embodiments, the TLB 105 notifies the L1 cache controller 125 of the address of the evicted TLB entry 115, and in other embodiments, the TLB 105 skips the L1 cache controller 125 and directly notifies the L2 cache controller 135 or the L3 cache controller 145 of the address of the evicted TLB entry 115. For example, in some embodiments the timing and or area of the L1 cache 120 is too sensitive to include additional routing and logic to process the TLB eviction information, or the L1 cache 120 is small enough that by the time a TLB entry has been evicted, any corresponding lines will likely also have been evicted from the L1 cache 120.

In some embodiments, the processing system 100 employs coalesced TLB entries in which a single TLB entry contains translation information for N consecutive page table entries. For example, if coalescing of four consecutive pages is supported, then upon eviction of a coalesced TLB entry, the TLB 105 either sends a single coalesced notification to the cache logic (e.g., notifying the cache logic that a 16 KB page was evicted from the TLB 105), or the TLB 105 sends four separate notifications to the cache logic corresponding to each of the four original pages in the corresponding coalesced TLB entry.

Figure 2:
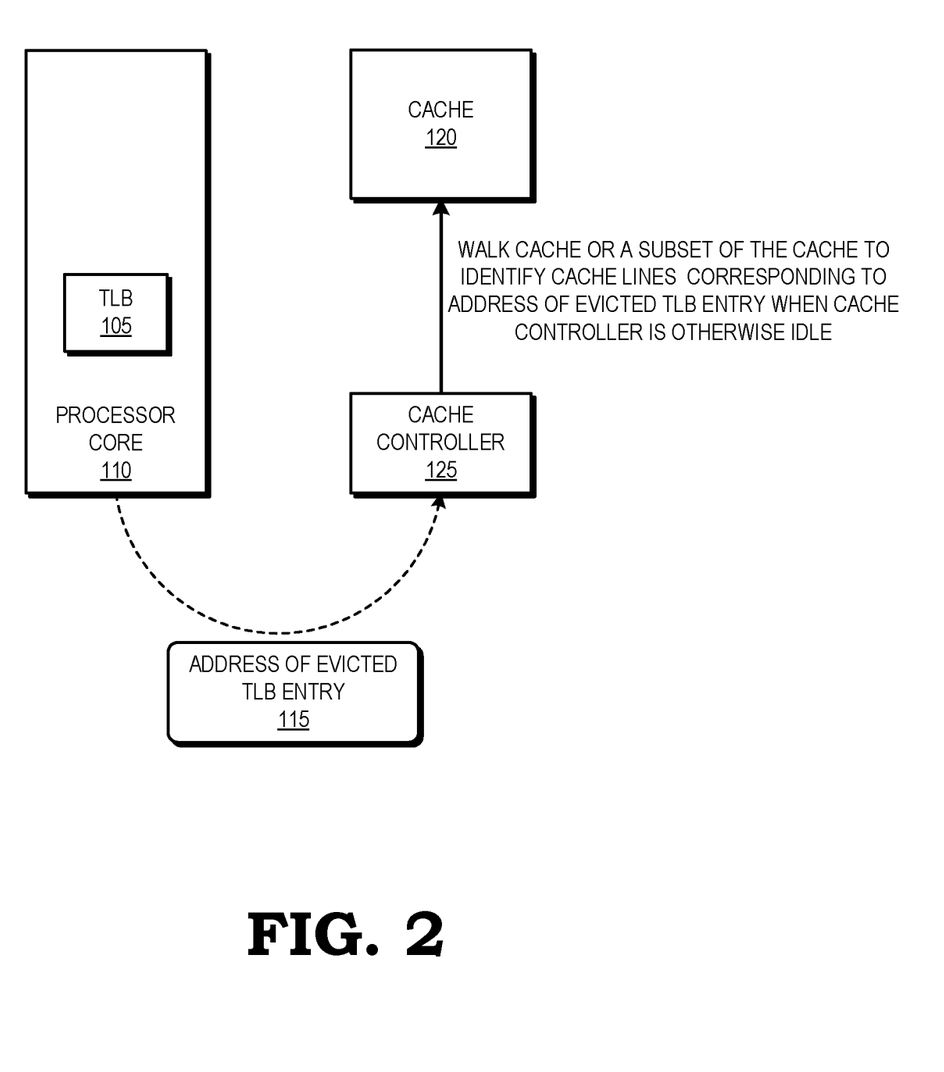
FIG. 2 is a block diagram of an example of the processing system of FIG. 1 identifying cache lines corresponding to an address of an evicted TLB entry in accordance with some embodiments.

FIG. 2 illustrates an example of the processing system 100 of FIG. 1 identifying cache lines corresponding to an address of an evicted TLB entry 115 in accordance with some embodiments. The processor core 110 maintains a TLB 105 to store frequently requested virtual-to-physical address translations. Upon eviction of an entry indicating a virtual-to-physical address translation of a physical page address 115, the TLB 105 communicates the physical page address of the evicted TLB entry 115 to cache logic of the L1 cache controller 125 for L1 cache 120 so that the L1 cache controller 125 can select for replacement any cache lines stored at the L1 cache 120 having addresses corresponding to the physical page address of the evicted TLB entry 115. Although described in the context of the L1 cache 120, in other embodiments, the cache controller 125 corresponds to any one of L1 cache controller 125, L2 cache controller 135, and L3 cache controller 145, and the cache 120 corresponds to L1 cache 120, L2 cache 130, or L3 cache 140, respectively.

In the depicted example, to conserve cache access bandwidth, the cache logic only walks the corresponding cache to identify cache lines corresponding to the physical page address of the evicted TLB entry 115 during cycles in which no other memory access requests are being processed. For example, in some embodiments the cache controller 125 employs a cache access arbitration that assigns a lowest priority to TLB eviction-related cache invalidations. In this way, the cache controller 125 identifies for replacement cache lines corresponding to evicted TLB entries, thus potentially improving cache hit rates, without delaying the processing of other performance-critical cache requests.

Figure 3:
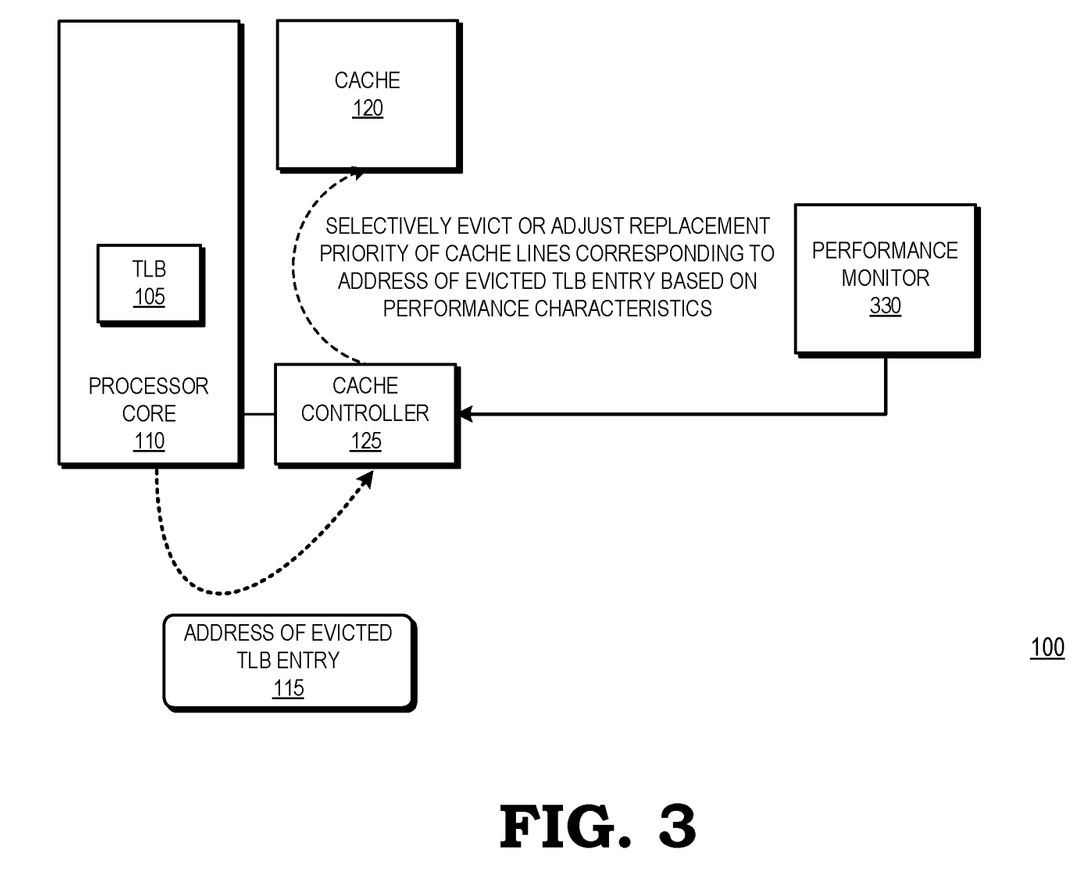
FIG. 3 is a block diagram of an example of the processing system of FIG. 1 selectively evicting or adjusting a replacement priority of cache lines corresponding to an address of an evicted TLB entry in accordance with some embodiments.

FIG. 3 illustrates an example of the processing system 100 of FIG. 1 selectively evicting or adjusting a replacement priority of cache lines corresponding to an address of an evicted TLB entry 115 in accordance with some embodiments. In some instances, demoting a cache line corresponding to the physical page address of an evicted TLB entry 115 under a cache replacement policy implemented by the cache controller 125 at the cache 120 rather than invalidating the cache line will avoid (or defer) additional coherence traffic. For example, if the affected cache line was modified, then the modified data must be written back to the next level of the cache hierarchy. Depending on the inclusion properties of the cache hierarchy, additional coherence traffic may be needed to notify the system of the eviction of even clean cache lines. On the other hand, if the cache line is going to be eventually evicted in any event, performing coherence actions earlier may be beneficial as they could potentially be scheduled during times when the cache hierarchy is experiencing reduced traffic. Accordingly, in some embodiments, rather than invalidating a cache line corresponding to the physical page address of an evicted TLB entry 115, the cache controller 125 adjusts the cache replacement priority of the corresponding cache line. For example, in some embodiments, the cache controller 125 reduces the retention priority of cache lines corresponding to the physical page address of the evicted TLB entry 115.

To illustrate, in embodiments in which the cache controller 125 utilizes a least recently used (LRU) replacement policy, then the cache controller 125 demotes to the LRU position in the replacement stack any cache lines having addresses corresponding to the page address of the evicted TLB entry 115 in response to receiving a communication from the TLB 105 that the TLB entry 115 has been evicted. In embodiments in which the cache controller 125 utilizes a least frequently used (LFU) replacement policy, in response to receiving a communication from the TLB 105 that the TLB entry 115 has been evicted the cache controller 125 sets to zero the access frequency counters of any cache lines having addresses corresponding to the page address of the evicted TLB entry 115 to indicate the equivalence of being the least frequently used lines. In embodiments in which the cache controller 125 utilizes a re-reference interval prediction (RRIP) replacement policy, in response to receiving a communication from the TLB 105 that the TLB entry 115 has been evicted the cache controller 125 sets to zero a replacement priority counter of cache lines having addresses corresponding to the page address of the evicted TLB entry to indicate lowest priority for retention. In other embodiments in which the cache controller 125 utilizes an RRIP replacement policy, the cache controller increments the counters of other cache lines that do not have addresses corresponding to the page address of the evicted TLB entry 115.

In the depicted example, the processing system 100 includes a performance monitor 330. The performance monitor 330 is implemented as hard-coded logic of the processing system 100, as firmware or programmable logic of the processing system 100, or a combination thereof. The performance monitor 330 measures one or more performance characteristics of the processing system 100 based on which the cache controller 125 selectively invalidates or demotes cache lines corresponding to the physical page address of the evicted TLB entry 115. For example, if the performance monitor 330 determines that the level of traffic at the cache 120 is higher than a threshold amount, the cache controller 125 selectively demotes the retention priority of cache lines corresponding to the physical page address of the evicted TLB entry 115 in order to avoid additional writeback or coherence traffic. On the other hand, if the performance monitor 330 determines that the level of traffic at the cache 120 is below the threshold amount, the cache controller 125 selectively invalidates cache lines having addresses corresponding to the physical page address of the evicted TLB entry 115. Although described in the context of the L1 cache controller 125, in other embodiments, the cache controller 125 corresponds to any one of L1 cache controller 125, L2 cache controller 135, and L3 cache controller 145, and the cache 120 corresponds to L1 cache 120, L2 cache 130, or L3 cache 140, respectively.

Figure 4:
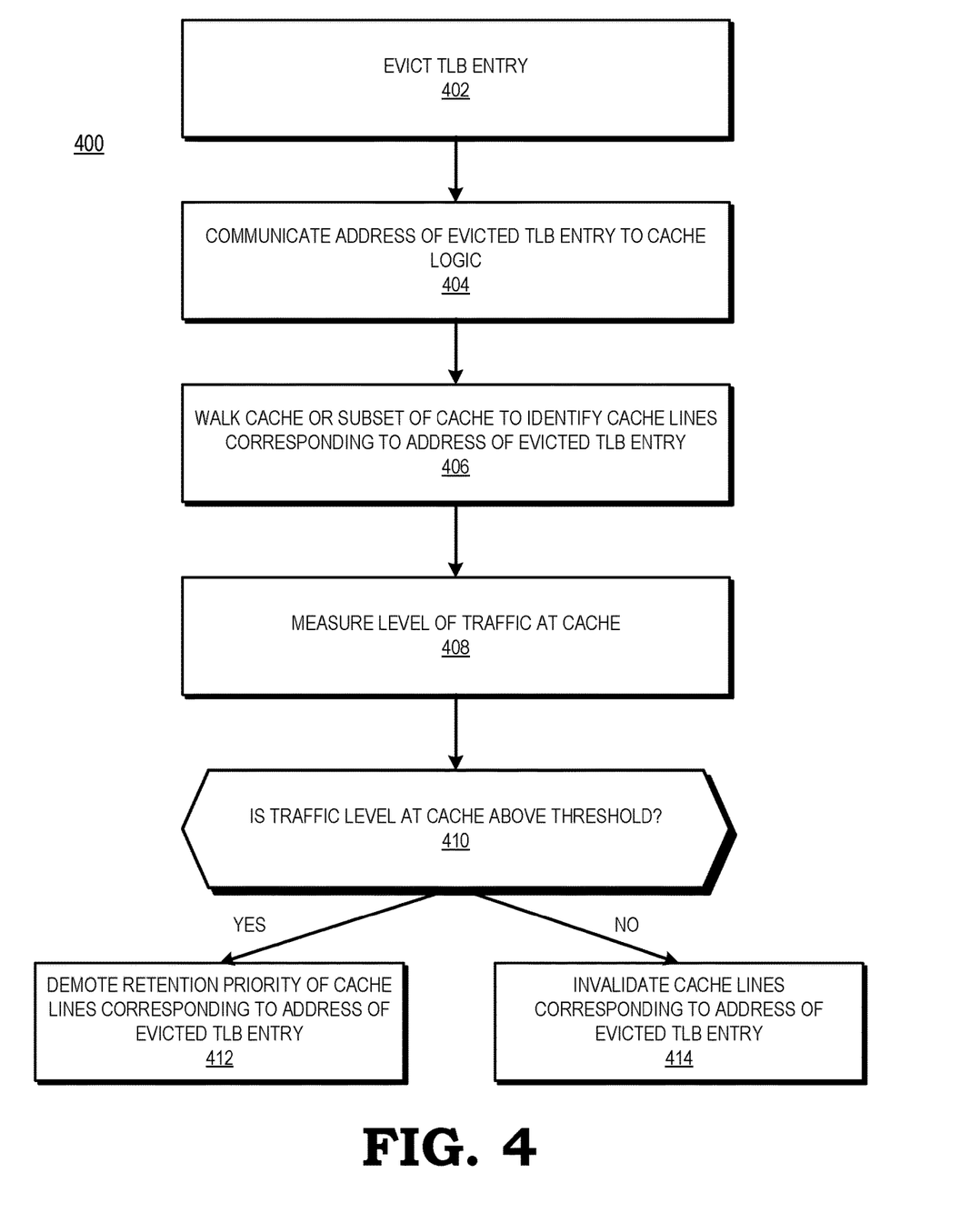
FIG. 4 is a flow diagram illustrating a method for implementing a cache replacement policy based on evictions of TLB entries in accordance with some embodiments.

FIG. 4 illustrates a method 400 for implementing a cache replacement policy based on evictions of TLB entries in accordance with some embodiments. The method 400 is implemented in some embodiments of the processing system 100 shown in FIGS. 1-3.

At block 402, the TLB 105 evicts an entry according to a replacement policy implemented at the TLB 105, such as a least recently used policy. At block 404, the TLB 105 communicates the physical or virtual page address of the evicted TLB entry 115 to cache logic such as a cache controller 125 for a cache 120 of the processing system 100. At block 406, the cache controller 125 walks the cache 120 or a subset of the cache 120 to identify any cache lines having addresses that match the page address of the evicted TLB entry 115. At block 408, the performance monitor 330 measures traffic or other performance characteristics of the processing system 100. At block 410, the performance monitor 330 determines whether the traffic at the cache 120 is above a threshold amount. If, at block 410, the performance monitor 330 determines that the traffic at the cache 120 is above the threshold amount, the method flow continues to block 412. At block 412, the cache controller 125 demotes the retention priority of cache lines at the cache 120 having addresses corresponding to the page address of the evicted TLB entry 115. If, at block 410, the performance monitor 330 determines that the traffic at the cache 120 is not above the threshold amount, the method flow continues to block 414. At block 414, the cache controller 125 invalidates cache lines at the cache 120 having addresses corresponding to the page address of the evicted TLB entry 115.

Figure 5:
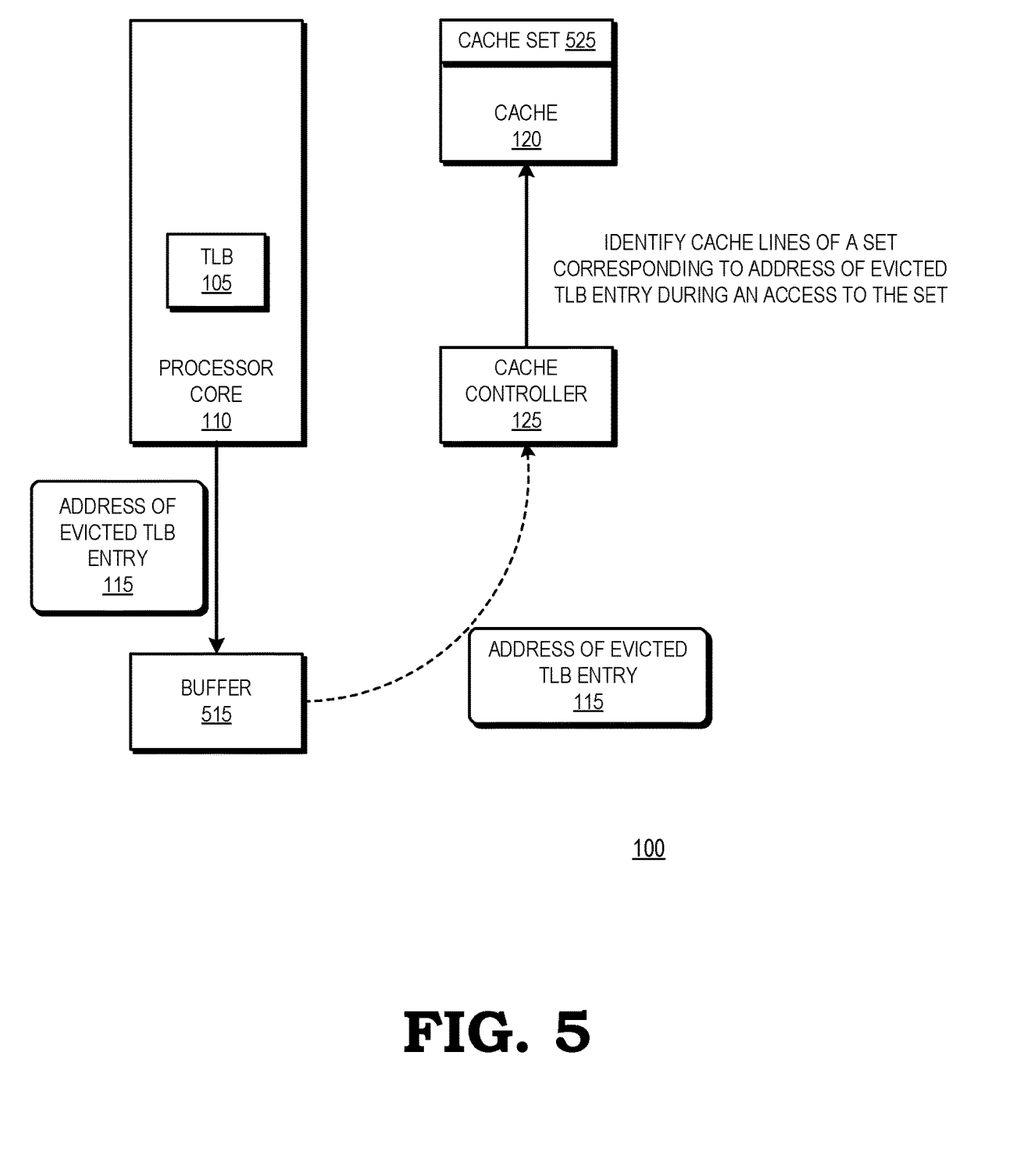
FIG. 5 is a block diagram of an example of the processing system of FIG. 1 employing a buffer to store addresses of evicted TLB entries for identification of corresponding cache lines in accordance with some embodiments.

FIG. 5 illustrates an example of the processing system 100 of FIG. 1 employing a buffer 515 to store addresses of evicted TLB entries 115 for identification of corresponding cache lines in accordance with some embodiments. In the illustrated example, instead of walking the cache 120 to identify cache lines corresponding to the page address of an evicted TLB entry 115, when the cache controller 125 is notified of an evicted TLB entry 115, the cache controller 125 inserts the physical page address of the evicted TLB entry 115 into the buffer 515. In some embodiments, the buffer 515 is implemented as a first-in-first-out (FIFO) buffer. On each access of a cache set of the cache 120 (for example, cache set 525), the cache controller 125 compares the addresses of all cache lines in the set 525 to the page addresses in the buffer 515. The cache controller 125 invalidates or demotes any matching addresses using any of the mechanisms described above. In this manner, the cache controller 125 makes no additional accesses to the cache to search for cache lines corresponding to the evicted TLB page(s) 115.

The size of the buffer 515 is a matter of design choice. To keep the buffer 515 up to date, each time an entry is inserted to the TLB 105, the TLB 105 checks the buffer 515 for entries matching the entry to be inserted to the TLB 105. If a matching entry is found at the buffer 515, the TLB 105 invalidates the matching entry at the buffer 515. In this manner, the buffer 515 does not store any valid TLB entries and the cache controller 125 will not prioritize for eviction from the cache 120 any cache lines corresponding to the entry to be inserted to the TLB 105.

In some embodiments, the buffer 515 of recently evicted TLB entries also operates as a victim cache of recently evicted TLB entries. When the processor core 110 searches the TLB 105 for a virtual-to-physical address translation that is not stored at the TLB 105 (i.e., when the processor core 110 experiences a TLB miss), before the processor core 110 searches for the translation at the page table 155, the TLB 105 checks the buffer 515 for the missing virtual address. If the missing virtual address is present among the evicted TLB entries stored at the buffer 515, the buffer 515 directly supplies the virtual-to-physical address translation, thereby avoiding expending resources and bandwidth to perform a page table walk operation.

Figure 6:
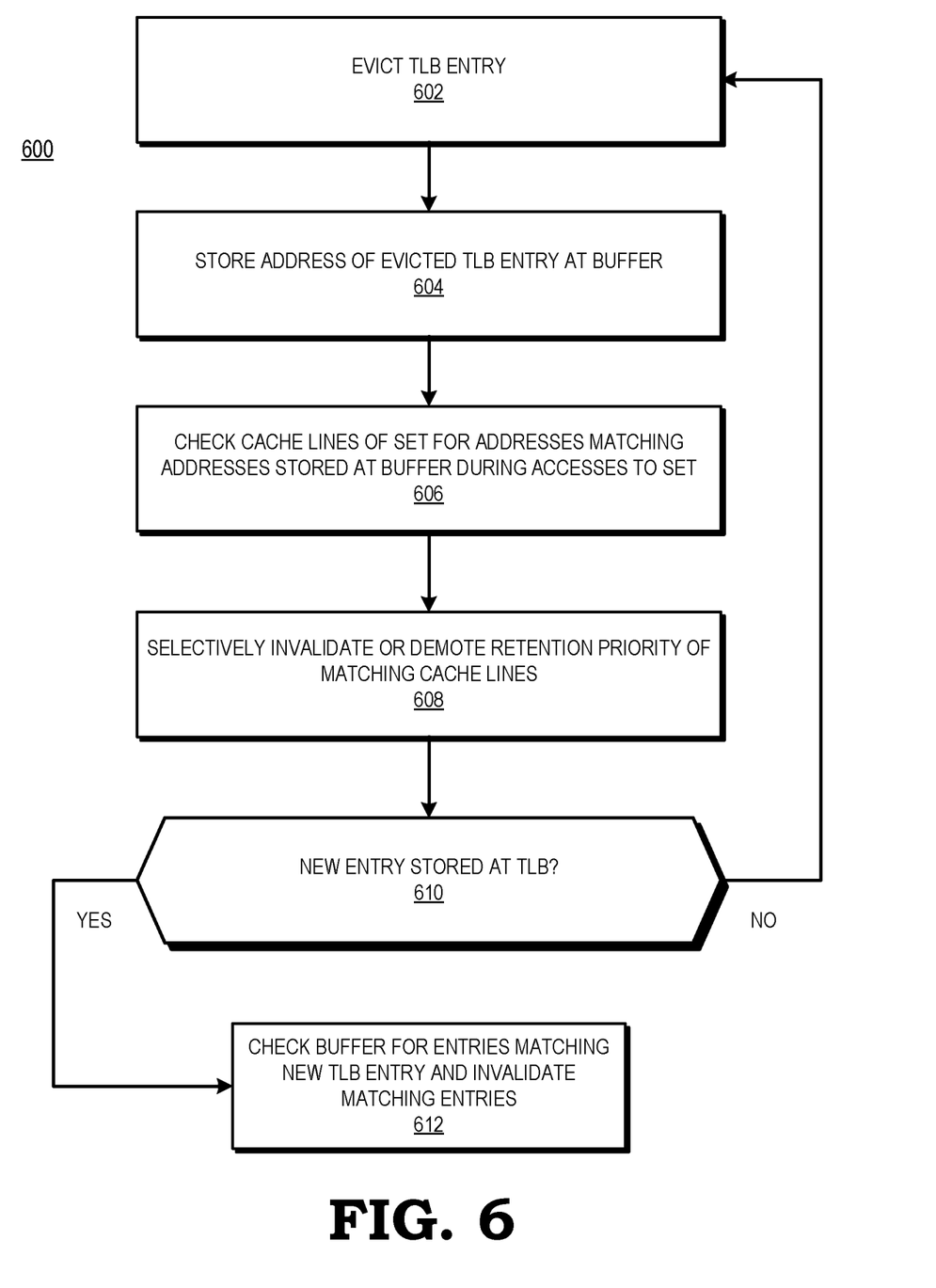
FIG. 6 is a flow diagram illustrating a method for implementing a cache replacement policy based on evictions of TLB entries in accordance with some embodiments.

FIG. 6 illustrates a method 600 for implementing a cache replacement policy based on evictions of TLB entries in accordance with some embodiments. The method 600 is implemented in some embodiments of the processing system 100 shown in FIGS. 1 and 5.

At block 602, the TLB 105 evicts an entry according to a replacement policy implemented at the TLB 105, such as a least recently used policy. At block 604, the TLB 105 stores the physical page address of the evicted TLB entry 115 at the buffer 515. In some embodiments, the TLB 105 stores the evicted TLB entry 115, including the virtual-to-physical address translation at the buffer 515. At block 606, the cache controller 125 checks cache lines of the set 525 for addresses matching the addresses of evicted TLB entries 115 stored at the buffer 515 while the cache controller 125 accesses the set 525 in the course of performing, e.g., a memory access request to the set 525. At block 608, the cache controller 125 selectively invalidates or demotes the retention priority of cache lines of the set 525 that match addresses stored at the buffer 515. At block 610, the TLB 105 determines whether a new entry has been inserted at the TLB 105. If, at block 610, a new entry has been stored at the TLB 105, the method flow continues to block 612. At block 612, the TLB 105 checks the buffer 515 for entries having addresses matching the new TLB entry and invalidates any matching entries at the buffer 515. If, at block 610, no new entries have been stored at the TLB 105, the method flow continues back to block 602.

Figure 7:
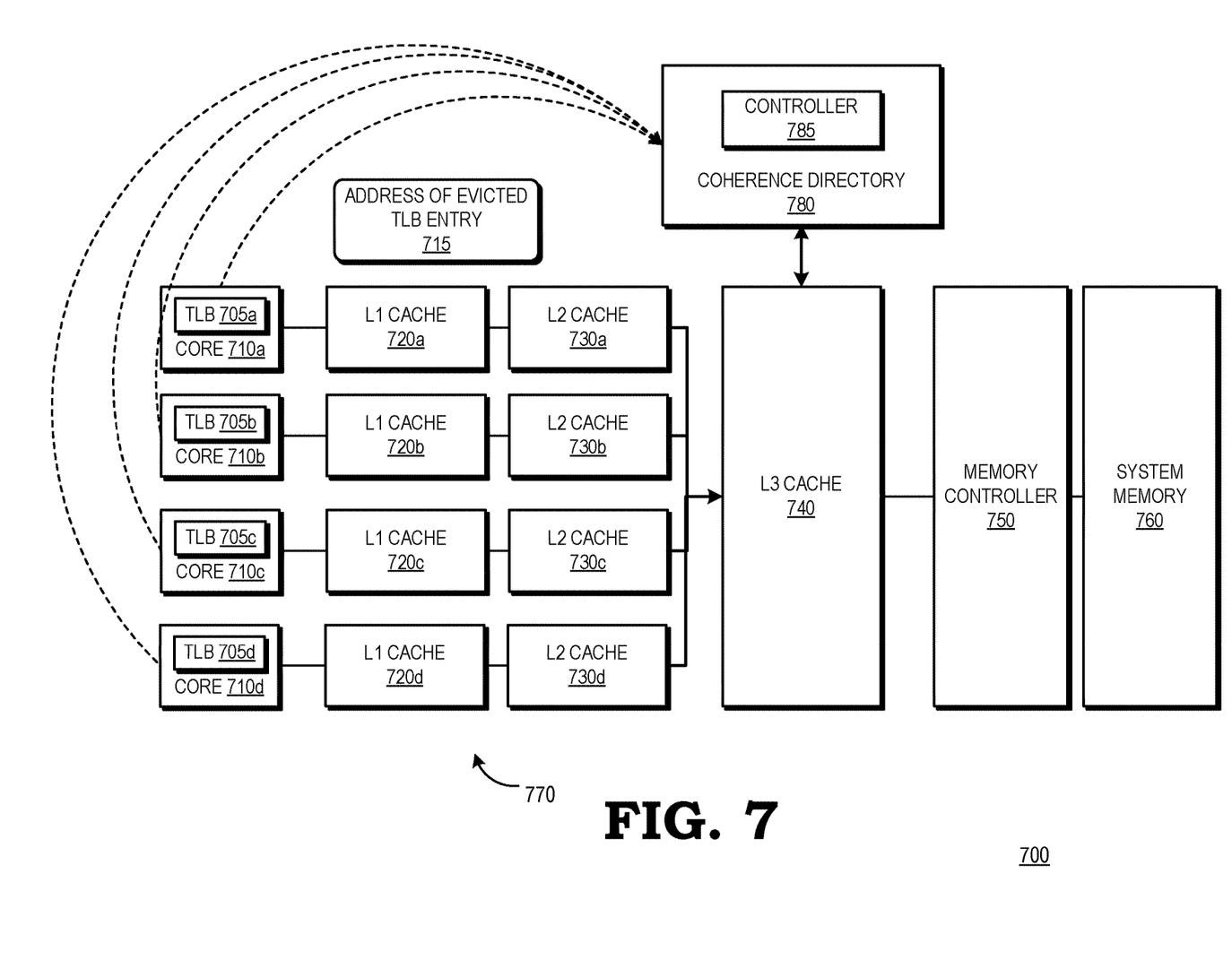
FIG. 7 is a block diagram of a processing system employing a cache hierarchy with a cache coherence directory for identifying cache lines corresponding to addresses of evicted TLB entries in accordance with some embodiments.

FIG. 7 is a block diagram of a processing system 700 employing a cache hierarchy 770 with a cache coherence directory 780 for identifying cache lines corresponding to addresses of evicted TLB entries 715 in accordance with some embodiments. In the depicted example, the processing system 700 includes a plurality of processor cores 710a, 710b, 710c, and 710d, each of which includes private caches and one or more shared caches. Rather than communicating a TLB eviction directly to cache logic for a particular cache, the TLB 705a, 705b, 705c or 705d instead sends eviction notification to the processor system's coherence directory 780, probe filter, or similar structure. The coherence directory 780 tracks cache lines currently cached in the different processor cores, as described below.

The cache hierarchy 770 includes one or more levels of caches, such as a first level (L1), a second level (L2), and a third level (L3) of caches. Although the illustrated example includes three levels, in other embodiments the cache hierarchy 770 includes fewer than three levels or more than three levels. Each caching level includes one or more caches at that level. To illustrate, each processor core 710a, 710b, 710c, and 710d implements small private caches at L1, which are depicted as L1 caches 720a, 720b, 720c, and 720d, each associated with a corresponding one of processor cores 710a, 710b, 710c, and 710d. Further, for L2, each processor core 710 implements larger private caches, which are depicted as L2 caches 730a, 730b, 730c, and 730d corresponding to processor cores 710a, 710b, 710c, and 710d, respectively. Each of the L2 caches 730a, 730b, 730c, and 730d is private to its corresponding processor core, but the cache hierarchy 770 operates to maintain coherency between the L2 caches 730a, 730b, 730c, and 730d. In other embodiments, two or more L1 caches may share a single L2 cache. For the L3 caching level, the cache hierarchy 770 implements an L3 cache 740 that is shared by the processor cores 710 of the processing system 700, and thus shared by at least the L2 caches 730a, 730b, 730c, and 730d. In other embodiments, the L3 caching level may include more than one L3 cache shared by the L2 caches 730 in various combinations. The L1 caches 720a, 720b, 720c, and 720d, L2 caches 730a, 730b, 730c, and 730d, and L3 cache 740 can be direct mapped or an N-way set associative caches in some embodiments.

The caches of the cache hierarchy 770 are used to cache data for access and manipulation by the processor cores 710a, 710b, 710c, and 710d. Typically, caches at a lower level (e.g., L1) tend to have lower storage capacity and lower access latencies, while caches at the higher level (e.g., L3) tend to have higher storage capacity and higher access latencies. Accordingly, cache lines of data are transferred among the caches of different cache levels so as to better optimize the utilization of the cache data in view of the caches' storage capacities and access latencies through cache line eviction processes and cache line installation processes managed by cache logic of the individual caches of the cache hierarchy 770.

The cache hierarchy 770 implements one or more coherency protocols, such as the Modified-Exclusive-Shared-Invalid (MESI) protocol or the Modified-Owned-Exclusive-Shared-Invalid (MOESI) protocol. The cache hierarchy 104 implements directory-based coherency, and thus implements a cache coherence directory (CCD) 780 to maintain coherency within the cache hierarchy 770.

In at least one embodiment, the CCD 780 is a page-based cache coherence directory, that is, the CCD 780 tracks cache lines on the basis of groups of contiguous cache lines referred to as "cache pages" or simply "pages." To this end, the CCD 780 includes a plurality of page entries, each page entry storing information pertaining to the coherency state of cache lines of a corresponding cache page for which the page entry is allocated. The directory structure of the CCD 780 may be implemented by memory (e.g., static random access memory (SRAM) or dynamic RAM (DRAM)) separate from the memory implementing the caches of the cache hierarchy 704, or the directory structure of the CCD 780 may be implemented at least in part in memory utilized by one or more caches. To illustrate, in some embodiments, a portion of the memory for use by the L3 cache 140 is instead used to implement the directory structure of the CCD 780. A controller 785 of the CCD 780 maintains the directory structure and is implemented as hard-coded logic on one or more integrated circuit (IC) chips implementing the processing system 700, as programmable logic, as configurable logic (e.g., fuse-configurable logic), one or more processors executing a program of instructions, or a combination thereof.

In operation, whenever a cache line is installed, evicted, or its coherency state is otherwise modified, the cache associated with that action sends a probe message that is received by the controller 785, which in turn updates the page entry in the directory structure that is allocated to the cache page that includes the indicated cache line. Moreover, certain updates, such as modification, invalidation, or eviction of a cache line trigger the controller 785 to send directed, multi-cast, or broadcast probe messages to any other caches that may contain a copy of that cache line so as to update their local coherency status indicators for that local copy of the cache line. As such, the directory structure maintains the current coherency and cached state of cache lines of cache pages currently in use by the processing system 700.

The sizes of cache pages tracked by the CCD 780 may be the same or different from the sizes of pages tracked at the TLBs 705a, 705b, 705c or 705d of each processor core 710. For example, in some embodiments the TLBs 705a, 705b, 705c or 705d track 4 KB pages, and the CCD 780 tracks 1 KB pages. In response to an entry of a TLB 705a, 705b, 705c or 705d5 being evicted, the TLB 705a, 705b, 705c or 705d notifies the CCD 780 of the eviction. The controller 785 then marks the corresponding page at the directory structure as "dead". Subsequently, when the controller 785 evicts a page from the directory structure of the CCD 780, the controller 785 selects one of the pages marked dead. In embodiments of the CCD 780 that implement an inclusive policy (meaning that any line cached by any of the processor cores 710a, 710b, 710c, and 710d must be tracked by the CCD 780, and therefore any page evicted from the CCD 780 must have its constituent lines evicted from all of the caches 720a, 720b, 720c, 720d, 730a, 730b, 730c, 730d, and 740), evicting the dead page automatically invokes the existing mechanisms of the CCD 780 to invalidate or flush all cache lines from the corresponding page from all of the caches 720*a*, 720*b*, 720*c*, 720*d*, 730*a*, 730*b*, 730*c*, 730*d*, and 740 in all of the processor cores 710*a*, 710*b*, 710*c*, and 710*d*.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
communicating, at a translation lookaside buffer (TLB) of a processor, a memory page address corresponding to a TLB entry to a cache logic of a cache in response to the TLB entry being evicted from the TLB;
measuring a performance characteristic of the processor; and
invalidating one or more cache lines of the cache corresponding to the memory page address or reducing a retention priority of the one or more cache lines based on the measured performance characteristic.

2. The method of claim 1, wherein invalidating comprises:
walking the cache to identify one or more cache lines corresponding to the memory page address;
setting, at the cache logic, a validity status of the one or more cache lines to an invalid state; and
evicting data stored at the one or more cache lines having an invalid state.

3. The method of claim 2, wherein walking comprises:
identifying a subset of the cache that contains cache lines that potentially map to the memory page address corresponding to the TLB entry; and
walking the subset of the cache to identify one or more cache lines corresponding to the memory page address.

4. The method of claim 2, wherein walking comprises walking the cache to identify one or more cache lines corresponding to the memory page address only during cycles in which the cache logic is not processing other requests.

5. The method of claim 1, wherein the retention priority of the one or more cache lines is reduced according to a cache replacement policy implemented at the cache.

6. The method of claim 1, wherein invalidating the one or more cache lines
comprises selectively setting, at the cache logic, a validity status of the one or more cache lines to an invalid.

7. The method of claim 1, further comprising:
storing the memory page address at a buffer;
in response to accessing a cache line at a set, comparing addresses of cache lines of the set to the memory page address stored at the buffer; and
wherein the one or more cache lines are invalided or the retention priority is reduced further based on the one or more cache lines matching the memory page address stored at the buffer.

8. The method of claim 1, wherein:
communicating comprises communicating a notification of the TLB entry eviction to a coherence directory of the processor; and
invalidating comprises, at the coherence directory, marking a page corresponding to the memory page address as dead.

9. A method, comprising:
in response to eviction of a translation lookaside buffer (TLB) entry indicating a virtual-to-physical address translation from a TLB of a processor, adjusting, for a cache, a cache replacement priority of cache lines storing data or instructions having addresses corresponding to a physical address or a virtual address of the TLB entry wherein adjusting the cache replacement priority maintains one or more of the cache lines in a valid state.

10. The method of claim 9, further comprising:
walking the cache to identify cache lines corresponding to the physical address or virtual address of the TLB entry; and wherein adjusting comprises:
  setting a validity status of the cache lines to an invalid state; and
  evicting data or instructions stored at the cache lines having an invalid state.

11. The method of claim 10, wherein walking comprises:
identifying a subset of cache lines that potentially map to the physical address or virtual address corresponding to the TLB entry; and
walking the subset of cache lines to identify cache lines corresponding to the physical address or virtual address.

12. The method of claim 10, wherein walking comprises walking the cache to identify cache lines corresponding to the physical address or virtual address only during cycles in which cache logic of the cache is not processing other requests.

13. The method of claim 9, wherein adjusting comprises reducing a retention priority of the cache lines according to a cache replacement policy implemented at the cache.

14. The method of claim 9, further comprising:
measuring a performance characteristic of the processor; and wherein
adjusting comprises selectively adjusting a validity status of the cache lines to an invalid state or reducing a retention priority of the cache lines according to a cache replacement policy implemented at the cache based on the performance characteristic.

15. The method of claim 9, further comprising:
storing the physical address or virtual address at a buffer;
in response to accessing a cache line of a set of cache lines, comparing addresses of data or instructions stored at cache lines of the set to the physical address or virtual address stored at the buffer; and
wherein adjusting comprises adjusting the cache replacement priority of cache lines of the set that match the physical address or virtual address stored at the buffer.

16. A processor, comprising:
a translation lookaside buffer (TLB);
a cache; and
cache logic configured to adjust a cache replacement priority of one or more cache lines of the cache storing data or instructions having an address corresponding to a physical or virtual address of an entry of the TLB in response to receiving a communication from the TLB that the entry of the TLB has been evicted, wherein adjusting the cache replacement piority maintains at least one of the cache lines in a valid state.

17. The processor of claim 16, wherein the cache logic is configured to identify cache lines corresponding to the physical or virtual address by walking the cache only during cycles in which the cache logic is not processing other requests.

18. The processor of claim 16, further comprising:
a performance monitor configured to measure a performance characteristic of the processor; and
wherein the cache logic is further configured to selectively adjust a validity status of the one or more cache lines to an invalid state or reduce a retention priority of the one or more cache lines according to a cache replacement policy implemented at the cache based on the performance characteristic.

19. The processor of claim 16, further comprising:
a buffer configured to store the physical or virtual address; and wherein
the cache logic is further configured to compare addresses of data or instructions stored at cache lines of a set to the physical or virtual address stored at the buffer in response to accessing a cache line of the set and adjust the cache replacement priority of cache lines of the set that match the physical or virtual address stored at the buffer.

20. The processor of claim 16, wherein the cache logic comprises a coherency directory configured to mark a page corresponding to the physical or virtual address as dead in response to receiving a communication from the TLB that the entry of the TLB has been evicted.

* * * * *